US012670367B2

(12) United States Patent
Choi et al.

(10) Patent No.: US 12,670,367 B2
(45) Date of Patent: Jun. 30, 2026

(54) APPARATUS AND METHOD WITH NEURAL NETWORK OPERATION

(71) Applicants: SAMSUNG ELECTRONICS CO., LTD., Suwon-si (KR); IUCF-HYU(Industry-University Cooperation Foundation Hanyang University), Seoul (KR)

(72) Inventors: Jungwook Choi, Seoul (KR); Seongmin Park, Seoul (KR)

(73) Assignees: Samsung Electronics Co., Ltd., Suwon-si (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 801 days.

(21) Appl. No.: 18/112,125

(22) Filed: Feb. 21, 2023

(65) Prior Publication Data

US 2023/0306242 A1     Sep. 28, 2023

(30) Foreign Application Priority Data

Mar. 23, 2022    (KR) ........................ 10-2022-0036211
Jun. 8, 2022    (KR) ........................ 10-2022-0069660

(51) Int. Cl.
*G06N 3/048*        (2023.01)
*G06N 3/08*        (2023.01)
(Continued)

(52) U.S. Cl.
CPC .............. *G06N 3/048* (2023.01); *G06N 3/08* (2013.01); *G06N 3/045* (2023.01); *G06N 3/084* (2013.01); *G06N 3/096* (2023.01)

(58) Field of Classification Search
CPC .......... G06N 3/048; G06N 3/08; G06N 3/045; G06N 3/084; G06N 3/096
See application file for complete search history.

(56) References Cited

U.S. PATENT DOCUMENTS 6,532,454 B1*   3/2003  Werbos ................. G06N 20/00
                                                              706/14
2019/0311221 A1*  10/2019  Nariyambut Murali ....................
                                                              G06F 18/285
(Continued)

FOREIGN PATENT DOCUMENTS

KR    10-2019-0106185 A    9/2019
KR    10-2020-0018237 A    2/2020
(Continued)

OTHER PUBLICATIONS

Korean Office Action issued on Sep. 30, 2024, in counterpart Korean Patent Application No. 10-2022-0069660 (3 pages in English, 6 pages in Korean).
(Continued)

*Primary Examiner* — Jordany Nunez
(74) *Attorney, Agent, or Firm* — NSIP Law

(57) ABSTRACT
An apparatus and method with neural network operation are provided. A computing apparatus includes one or more processors, storage hardware storing instructions configured to, when executed by the one or more processors, cause the one or more processors to: extract calibration data from training data that is for training a main neural network, based on the calibration data, generate a look up table (LUT) for performing a non-linear function of the main neural network through an auxiliary network corresponding to a layer of the main neural network, and update a parameter of the LUT based on an output of the non-linear function and based on an output of the auxiliary network.

17 Claims, 6 Drawing Sheets

(51) Int. Cl.
    *G06N 3/084*       (2023.01)
    *G06N 3/045*       (2023.01)
    *G06N 3/096*       (2023.01)

(56)           References Cited

U.S. PATENT DOCUMENTS

| | | |
|---|---|---|
| 2020/0202213 A1 | 6/2020 | Darvish Rouhani et al. |
| 2021/0157282 A1* | 5/2021 | Abeloe .................. G06N 3/045 |
| 2021/0209475 A1* | 7/2021 | Baluja .................... G06N 3/048 |
| 2021/0256347 A1 | 8/2021 | Fujisawa et al. |
| 2021/0294784 A1* | 9/2021 | Ihor ..................... G06N 3/0495 |
| 2021/0303977 A1 | 9/2021 | Sun et al. |
| 2022/0383103 A1 | 12/2022 | Park et al. |

FOREIGN PATENT DOCUMENTS

| | | |
|---|---|---|
| KR | 10-2021-0045287 A | 4/2021 |
| KR | 10-2022-0157619 A | 11/2022 |

OTHER PUBLICATIONS

Park, Jun-Seok, et al. "9.5 A 6K-MAC feature-map-sparsity-aware neural processing unit in 5nm flagship mobile SoC." *2021 IEEE International Solid-State Circuits Conference (ISSCC)*. vol. 64. IEEE, (2021). pp. 152-154.

* cited by examiner

400

| Score | Task | Baseline | LUT | Fine-tuned LUT |
|---|---|---|---|---|
| Avg(acc, F1) | MRPC | 87.45 | 86.01 | 86.45 |
| Accuracy | RTE | 79.4 | 80.5 | 79.4 |
| mcc | CoLA | 62.08 | 61.07 | 61.83 |
| Accuracy | SST-2 | 94.6 | 94.4 | 94.5 |
| avg(pearson, spearman corr) | STS-B | 91.08 | 91.00 | 91.04 |
| Avg(acc, F1) | QQP | 90.15 | 89.97 | 90.15 |
| Accuracy | MNLI | 87.9 | 87.9 | 87.9 |
| Accuracy | QNLI | 92.8 | 92.7 | 92.9 |

FIG. 4

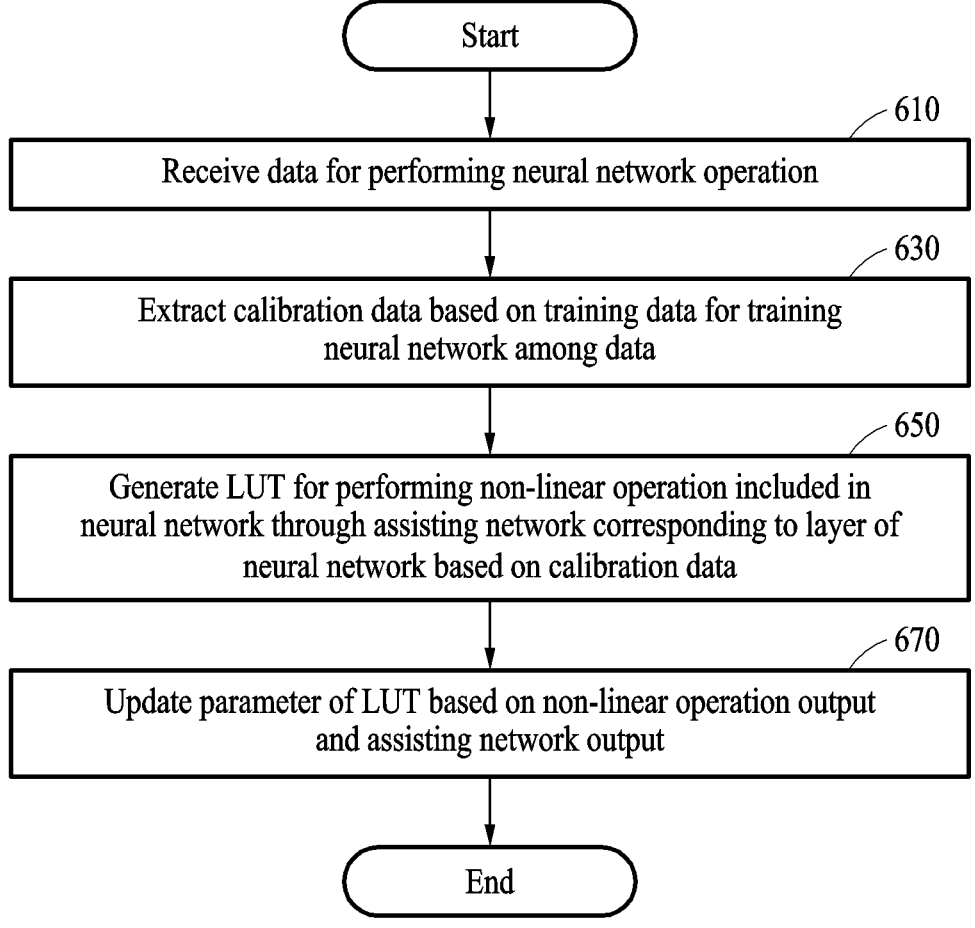

Start

610

Receive data for performing neural network operation

630

Extract calibration data based on training data for training
neural network among data

650

Generate LUT for performing non-linear operation included in
neural network through assisting network corresponding to layer of
neural network based on calibration data

670

Update parameter of LUT based on non-linear operation output
and assisting network output End

FIG. 6

APPARATUS AND METHOD WITH NEURAL NETWORK OPERATION

CROSS-REFERENCE TO RELATED APPLICATIONS

This application claims the benefit under 35 USC § 119(a) of Korean Patent Application No. 10-2022-0036211, filed on Mar. 23, 2022, and Korean Patent Application No. 10-2022-0069660, filed on Jun. 8, 2022, in the Korean Intellectual Property Office, the entire disclosures of which are incorporated herein by reference for all purposes.

BACKGROUND

1. Field

The following description relates to a neural network operation apparatus and method.

2. Description of Related Art

In a conventional neural network operation, when a lookup table (LUT) is used as a substitute for a non-linear activation function, for example, an error between the LUT and the non-linear function may occur, in particular, when a range of output values changes rapidly compared to a variation in input values. Due to such error of the conventional neural network operation method, the prediction accuracy of the final neural network model is reduced when using the LUT to perform an inference.

In addition, a large number of LUT indexes are required to approximate a section with a high fluctuation rate, which increases hardware cost. Although it may be beneficial for a neural network operation method to maintain an accuracy without increasing the number of LUT indexes, the performance of the neural network inference may be reduced when a non-linear function of the neural network is approximated using one LUT, for example, because layers of the neural network have different respective statistical characteristics of input data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a computing apparatus includes: one or more processors; storage hardware storing instructions configured to, when executed by the one or more processors, cause the one or more processors to: extract calibration data from training data that is for training a main neural network, based on the calibration data, generate a look up table (LUT) for performing a non-linear function of the main neural network through an auxiliary network corresponding to a layer of the main neural network, and update a parameter of the LUT based on an output of the non-linear function and based on an output of the auxiliary network.

The calibration data may be extracted at a predetermined ratio from the training data.

A first LUT may be generated based on a first auxiliary network corresponding to a first layer of the main neural network, and a second LUT may be generated based on a second auxiliary network corresponding to a second layer of the main neural network, wherein the LUT may include the first LUT and the second LUT.

A first output of the non-linear corresponding to a first layer of the neural network may be generated based on the calibration data, and forward propagation may be performed by inputting the first output of the non-linear function to a second layer of the main neural network.

The LUT may be generated by determining a scale or a bias of the LUT for approximating the non-linear function.

A parameter of the auxiliary network may be tuned by performing back propagation based on the output of the auxiliary network and the output of the non-linear function.

The parameter may be tuned based on a mean absolute error between the output of the auxiliary network and the output of the non-linear function.

The first layer and the second layer may be trained together based on the output of the non-linear function, wherein the non-linear function is an activation function of the first layer and the second layer.

The non-linear function may include a Gaussian error linear unit (GELU) function, a softmax function, a sigmoid function, or a layer normalization function.

In one general aspect, a neural network operating method is performed by a computing device that includes processing hardware and storage hardware, and the method includes: extracting calibration data from training data that is for training a main neural network, generating a look up table (LUT) for approximating a non-linear function of the main neural network, wherein the LUT is generated through an auxiliary network corresponding to a layer of the main neural network based on the calibration data, and updating a parameter of the LUT based on an output of the non-linear function and based on an output of the auxiliary network.

The LUT may be used as an activation function of the main neural network.

The generating of the LUT may include generating a first LUT based on a first auxiliary network corresponding to a first layer of the main neural network, and generating a second LUT based on a second auxiliary network corresponding to a second layer of the main neural network.

The updating of the parameter may include generating a first output of the non-linear operation corresponding to a first layer of the main neural network, based on the calibration data, and performing a forward propagation by inputting the first output of the non-linear function to a second layer of the main neural network.

The LUT may be generated by determining a scale or a bias of the LUT for approximating the non-linear function.

The updating of the parameter may include tuning a parameter of the auxiliary network by performing back propagation based on the output of the auxiliary network and the output of the non-linear function.

The parameter may be tuned based on a mean absolute error between the output of the auxiliary network and the output of the non-linear function.

The updating of the parameter may include training the first layer and the second layer at the same time based on the output of the non-linear function.

The non-linear function may include a Gaussian error linear unit (GELU) function, a softmax function, a sigmoid function, or a layer normalization function.

In one general aspect, a method is performed by an electronic computing device, and the method includes training a main neural network together with an auxiliary neural network based on a non-linear activation function of the main neural network; based on a LUT parameter generated by the auxiliary neural network, generating a LUT that approximates the non-linear activation function, and performing an inference by the main neural network using the LUT as an activation function of the main neural network.

A non-transitory computer-readable storage medium may store instructions that, when executed by a processor, cause the processor to perform any of the methods.

Other features and aspects will be apparent from the following detailed description, the drawings, and the claims.

BRIEF DESCRIPTION OF THE DRAWINGS

FIG. 4 illustrates performance of a neural network operation apparatus, according to one or more embodiments.

FIG. 6 illustrates an operation of the neural network operation apparatus shown in FIG. 1, according to one or more embodiments.

Figure 1:
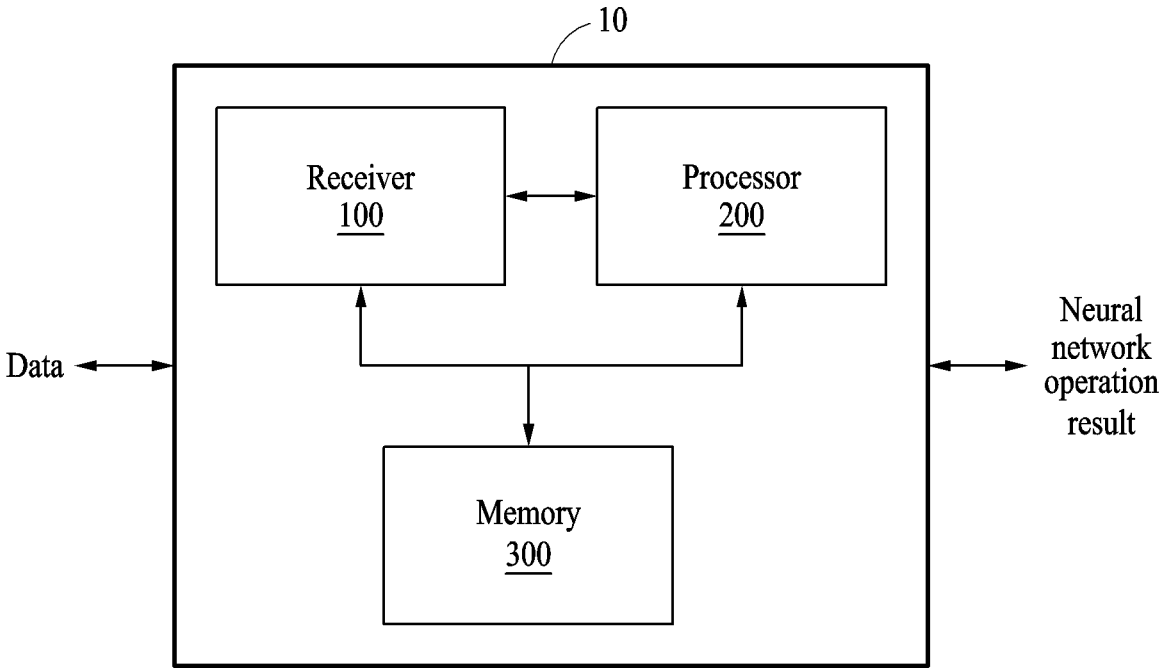
FIG. 1 illustrates an example of a neural network operation apparatus, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples are described in detail with reference to the accompanying drawings. When describing the examples with reference to the accompanying drawings, like reference numerals refer to like constituent elements.

FIG. 1 illustrates an example of a neural network operation apparatus, according to one or more embodiments.

Referring to FIG. 1, a neural network operation apparatus 10 may perform a neural network operation, which may include a non-linear function. The neural network operation apparatus 10 may generate a lookup table (LUT) which can approximate the non-linear function. The LUT may serve as a substitute for the non-linear function, which may increase speed of the neural network operation. For ease of reading, description of embodiments herein uses the phrase "the neural network operation apparatus" generically to encompass the numerous examples, embodiments, and variations described herein; not all of the apparatuses referred to by the phrase require all features described herein.

Some examples of non-linear functions are a sigmoid (or a logistic) function, a hyperbolic tangent, a rectified linear unit (ReLU) function, a leaky ReLU function, a parametric ReLU function, an exponential linear units function, a softmax function, a swish function, a Gaussian error linear unit (GeLU) function, a scaled exponential linear unit (SELU) function, combinations thereof, and so forth. In other words, a non-linear function/operation may be a function that maps an input domain of real numbers, for example, to a domain, for example, from 0 to 1, and may be used as an activation function for a node (in places herein, "range" may also refer to a portion of the domain of a non-linear function). An LUT may substitute for a non-linear function and may approximate same by providing rows of input-output pairs. In some implementations, an output value for any given input value is determined by finding, for example, the rows whose input values the given input value falls between (or a row that the given input value is closest to). In other words, rows may associate output values with respective increments or segments of the approximated non-linear function. As can be seen, an LUT may have a scale in that the span between input values can vary. In other words, an LUT can have varying granularity; the more rows in the LUT, the finer the granularity and, in most cases, the more accurate the LUT will approximate the non-linear function.

The neural network operation apparatus 10 may estimate an output of a non-linear function by using an LUT in lieu of directly calculating the non-linear function each time it is needed. The neural network operation apparatus 10 may use an auxiliary network corresponding to a layer included in a main neural network (performing the main operation) to generate the LUT. The auxiliary network may be implemented in the form of a neural network. In some embodiments, there may be auxiliary networks for respective layers of the main neural network (for some or all main layers) which may generate respective LUTs to serve as substitutes for non-linear functions of the respective layers of the main neural network. In other words, layers of the main neural network may employ respective layer-specific LUTs obtained based on auxiliary networks respectively corresponding to the layers of the main neural network.

A neural network as referred to herein may generally be a model having a problem-solving ability implemented through nodes forming a network through connections between the nodes, where the strength of the connections is changed through learning.

A node of a neural network may include a combination of weights and/or biases. A neural network may include one or more layers, each including one or more neurons or nodes. Such a neural network may infer a result from a predetermined input by changing the weights of the neurons through training.

Any of the neural networks described herein may be a deep neural network (DNN). The neural networks may be a convolutional neural network (CNN), a recurrent neural network (RNN), a perceptron, a multilayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), an attention network (AN), and/or combinations thereof. Any known types of suitable neural networks may be readily adapted to the techniques described herein.

The neural network operation apparatus 10 may be implemented in a personal computer (PC), a data server, a portable device, or any suitable computing device.

A portable device may be implemented as a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device. A smart device may include, for example, a smart watch, a smart band, and a smart ring.

The neural network operation apparatus 10 may generate LUTs corresponding to respective main layers in view of the fact that the main layers of a main neural network may have different statistical characteristics about the input data and may concentrate in different areas of the domain of a non-linear activation function. The neural network operation apparatus 10 may improve performance of the main neural network by using the LUTs corresponding to the respective main layers to provide the non-linear functionality of the non-linear function of the main layers (a LUT generally provides a result with less computation than needed by the non-linear function that it approximates).

The neural network operation apparatus 10 includes a receiver 100 and a processor 200. The neural network operation apparatus 10 further includes a memory 300.

The receiver 100 may receive data for performing a neural network operation. The receiver 100 may include a receiving interface (e.g., a network interface, an internal bus interface, a software interface (e.g., an application programming interface), and so forth). The receiver 100 may output the received data to the processor 200. The data related to the neural network may include a model parameter (or a weight) of a neural network, input data for performing a neural network operation, data output from a neural network, training data for training a neural network, and/or information related to a neural network operation.

The processor 200 may process data stored in the memory 300. The processor 200 may execute computer-readable code (for example, machine-executable instructions) stored in the memory 300 and instructions triggered or generated by the processor 200.

The processor 200 may be implemented by hardware including circuit(s) having physical structure to perform desired operations. For example, the desired operations may include code or instructions included in a program. As used herein, "a/the processor" refers to "one or more processors". The processor is hardware-implemented and may include a microprocessor, a central processing unit (CPU), a processor core, a multi-core processor, a multiprocessor, an application-specific integrated circuit (ASIC), and/or a field-programmable gate array (FPGA), combinations thereof, etc., to name a few examples.

The processor 200 may extract calibration data based on training data for training the main neural network. The processor 200 may extract the calibration data by extracting a predetermined ratio of data from among training data. For example, the predetermined ratio may be ⅒. That is, for every ten training samples received for training the neural network, one training sample may be extracted.

Based on the calibration data, the processor 200 may generate an LUT for providing non-linear functionality in the main neural network. The processor 200 may generate the LUT using an auxiliary neural network corresponding to a layer of the main neural network (whose non-linear activation function is to be approximated/substituted by the LUT) For example, the non-linear function may include the GELU function, the softmax function, or a layer normalization function, among others.

The processor 200 may generate the LUT by determining a scale and a bias for the LUT to approximate the non-linear function.

In some embodiments, the processor 200 may generate a first LUT based on a first auxiliary network corresponding to a first layer of the main neural network, and may generate a second LUT based on a second auxiliary network corresponding to a second layer of the main neural network.

The processor 200 may update a parameter of an LUT based on an output of the corresponding non-linear function and based on an output of the corresponding auxiliary network. The processor 200 may generate a first output of the non-linear function based on the calibration data. The processor 200 may perform forward propagation by inputting the first output of the non-linear function to the second layer of the main neural network.

The processor 200 may fine-tune the parameter of the auxiliary network by performing back propagation based on the output of the auxiliary network and the output of the non-linear function. The processor 200 may fine-tune the parameter of the auxiliary network based on a mean absolute error (MAE) between the output of the auxiliary network and the output of the non-linear function, for example.

The processor 200 may train the first layer and the second layer at the same time based on the output of the non-linear function.

The memory 300 may store the data for operation (e.g., a neural network operation) or the operation result. The memory 300 stores instructions (or programs) executable by the processor 200. For example, the instructions may include instructions for executing an operation of the processor and/or instructions for performing an operation of each component of the processor.

The memory 300 may be implemented as a volatile memory device and/or a non-volatile memory device (and is not a signal per se).

A volatile memory device may be implemented as dynamic random-access memory (DRAM), static random-access memory (SRAM), thyristor RAM (T-RAM), zero capacitor RAM (Z-RAM), or twin transistor RAM (TTRAM). A non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, a molecular electronic memory device, or insulator resistance change memory.

Figure 2:
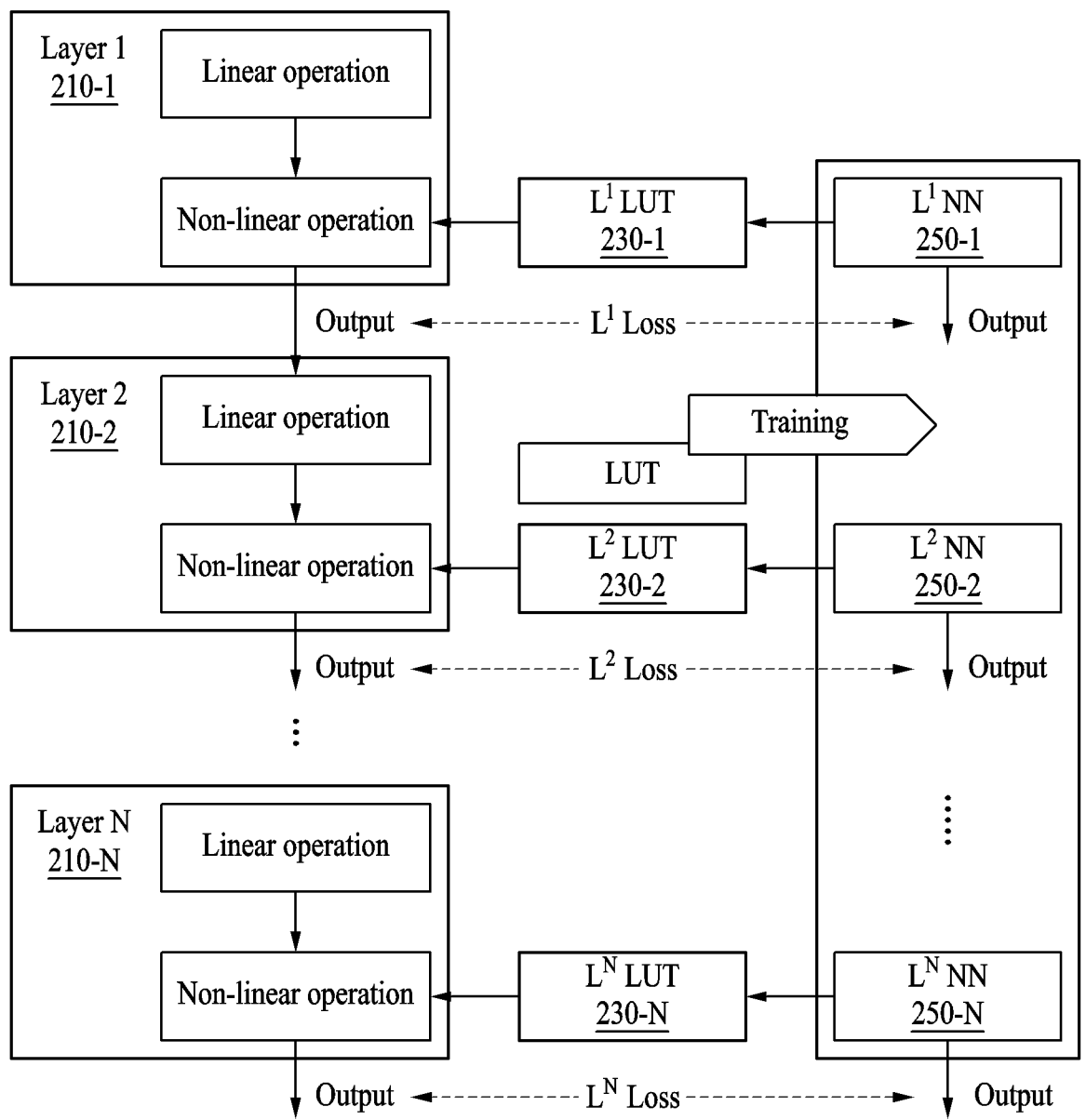
FIG. 2 illustrates an example of an operation of the neural network operation apparatus of FIG. 1, according to one or more embodiments.

FIG. 2 illustrates an example operation of the neural network operation apparatus of FIG. 1, according to one or more embodiments.

Referring to FIG. 2, a processor (e.g., the processor 200 of FIG. 1) may train the main neural network (left) and the auxiliary networks (right). The processor 200 may generate LUTs based on characteristics of respective layers constituting the main neural network. The processor 200 may train the auxiliary networks by fine-tuning parameters of the auxiliary networks based on back propagation. The processor 200 may improve performance of the main neural network by optimizing the LUTs based on the fine-tuned auxiliary networks.

The processor 200 may generate the auxiliary networks corresponding to each of the layers in the main neural network by using weights of the auxiliary networks as initial values.

The processor 200 may perform the fine-tuning training based on the difference between an LUT output generated by an auxiliary network and an output of the non-linear function of a corresponding layer of the main neural network. The processor 200 may perform the fine-tuning training by using, as the loss function, the MAE between the LUT output and the output of the non-linear function.

In this way, the processor 200 may naturally train the main neural network and/or the auxiliary network by performing back propagation to reduce the loss function, thus obviating any need to analyze statistical characteristic of the input data of each layer.

The main neural network may include N layers, e.g., a first layer 210-1, a second layer 210-2, . . . , up to an Nth layer 210-N (N is a natural number). Each layer may include a non-linear function (usually the same function), for example as an activation function. A first auxiliary network 250-1, a second auxiliary network 250-2, up to an Nth auxiliary network 250-N may respectively correspond to the layers of the main neural network. The processor 200 may generate a first LUT 230-1, a second LUT 230-2, . . . , an Nth LUT 230-N through training respectively corresponding auxiliary networks. As noted above, in some embodiments, only one or some main layers have respective auxiliary networks and LUTs.

The processor 200 may generate the LUTs 230-1, 230-2, . . . , 230-N by determining scales and/or biases of the respective LUTs. The processor 200 may generate the first LUT 230-1 based on the first auxiliary network 250-1 corresponding to the first layer 210-1 of the neural network. The processor 200 may generate the second LUT 230-2 based on the second auxiliary network 250-2 corresponding to the second layer 210-1 of the neural network, and so forth.

The processor 200 may update parameters of the respective LUTs 230-1, 230-2, . . . , 230-N based on outputs of the non-linear functions of the main layers and respective outputs of the auxiliary networks. The processor 200 may train the first layer 210-1 and the second layer 210-2 at the same time based on the output of the non-linear function. In some embodiments each main layers has its own LUT and auxiliary network. In other embodiments, only one or more main layers have an LUT and auxiliary network. Moreover, in some embodiments, the LUTs may be generated at one point in time using respective auxiliary networks, and at a later time the auxiliary networks may be disposed of (or otherwise not present in a device implementing the main neural network) and the LUTs may be used for inferencing by the main neural network.

The processor 200 may generate the first output (mentioned above) of the non-linear function of the first layer 210-1 of the neural network based on the calibration data. The processor 200 may perform forward propagation by inputting the first output of the non-linear function to the second layer 210-2 of the neural network.

The processor 200 may fine-tune a parameter of the auxiliary network by performing back propagation based on the output of the auxiliary network and the output of the non-linear function. The processor 200 may fine-tune the parameter of the auxiliary network based on the MAE between the output of the auxiliary network and the output of the non-linear function.

Figure 3A:
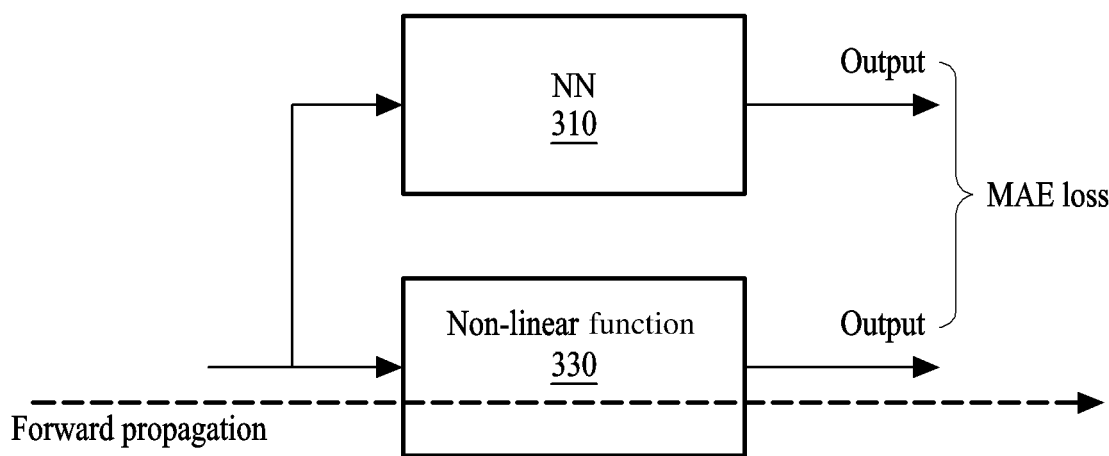
FIG. 3A illustrates a training process of an auxiliary network, according to one or more embodiments.
Figure 3B:
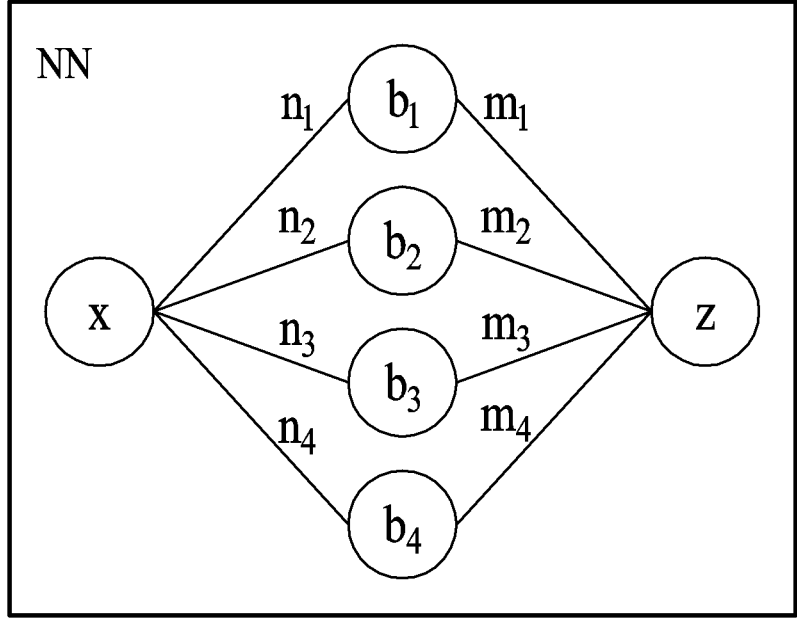
FIG. 3B illustrates an example of an auxiliary network, according to one or more embodiments.

FIG. 3A illustrates a training process of an auxiliary network, and FIG. 3B illustrates an example of an auxiliary network, according to one or more embodiments.

Referring to FIGS. 3A and 3B, a processor (the processor 200 of FIG. 1) may generate an LUT corresponding to a non-linear function of the neural network. The processor 200 may generate the LUT by configuring the auxiliary network.

The example illustrated in FIG. 3A uses an auxiliary network 310 and a non-linear function 330 of a main layer. The techniques for training the auxiliary network 310, as described below, may be used for any other auxiliary networks and respective main layers.

The processor 200 may use the weight of one pre-trained auxiliary network as an initial value of the weight of any other auxiliary networks.

The processor 200 may extract the calibration data from among the training data for training the main neural network. The processor 200 may extract the calibration data by extracting a predetermined ratio of data among the training data. Since the calibration data is extracted from the training data of the main neural network, the calibration data may have statistical characteristics similar to the overall training data.

The processor 200 may fine-tune the auxiliary network 310 based on the extracted calibration data.

The processor 200 may fine-tune the parameter of the auxiliary network 310 by performing back propagation based on the output of the auxiliary network 310 and the output of the non-linear operation 330. The processor 200 may fine-tune the parameter of the auxiliary network 310 based on the MAE between the output of the auxiliary network 310 and the output of the non-linear function 330.

As the layers of the main neural network deepen (i.e., as data passes deeper into the main neural network), error of the approximation of the non-linear function 330 by the corresponding LUT (e.g., a difference between, for a given input, what the actual non-linear function 330 would generate and what the LUT provides) may accumulate. The processor 200 may prevent the accumulation of such error (which may be caused by training the main layers at the same time), by using the output of the non-linear function 330 as the output transmitted to the next layer. Through this, training efficiency may be improved because the processor 200 does not accumulate the error but can train all layers of the main neural network at the same time.

The auxiliary network 310 may be formed as a neural network including one hidden layer (although more may be used). When generating an LUT of an N-entry, the auxiliary network 310 may consist of N–1 number of nodes. In this case, ReLU may be used as the non-linear activation function, for example.

The first layer of the auxiliary network 310 may include both the weight and the bias parameters, and the second layer may only include the weight parameter.

FIG. 4 illustrates performance of a neural network operation apparatus, according to one or more embodiments.

Referring to FIG. 4, a processor (e.g., the processor 200 of FIG. 1) may generate an LUT by fine-tuning an auxiliary network and thus improve performance of the main neural network. The example 400 of FIG. 4 indicates that a fine-tuned LUT may have better performance than a baseline LUT which is not fine-tuned.

The example of FIG. 4 shows the score (accuracy percentages) of each task when the layer normalization operation, which is an example of a non-linear function of the RoBERTa model, is approximated by an LUT.

The baseline column indicates the performance when the non-linear function of the RoBERTa model is used as is (no LUT), the LUT column indicates the performance when the non-linear function is substituted with one LUT, and the fine-tuned LUT column indicates the performance when the fine-tuned LUT (using the auxiliary network corresponding to each layer), is used.

The processor 200 may perform fine-tuning to generate an LUT which is optimized for each layer and thus use one LUT in most tasks to recover the decrease of performance (accuracy) which can occur when substituting an LUT for a non-linear function using only one LUT in most tasks. Note that "one LUT" may refer to the collective LUT data of all of the layers. In other words, each layer may have its own LUT portion, and collectively those LUT portions may also be thought of as one LUT.

The processor 200 may perform fine-tuning of the layers in parallel at the same time and thus perform training more efficiently than the scheme in which fine-tuning is performed sequentially for each layer. In other words, the main neural network and the auxiliary network(s) may each train on a same piece of training data passed to the main neural network.

Figure 5:
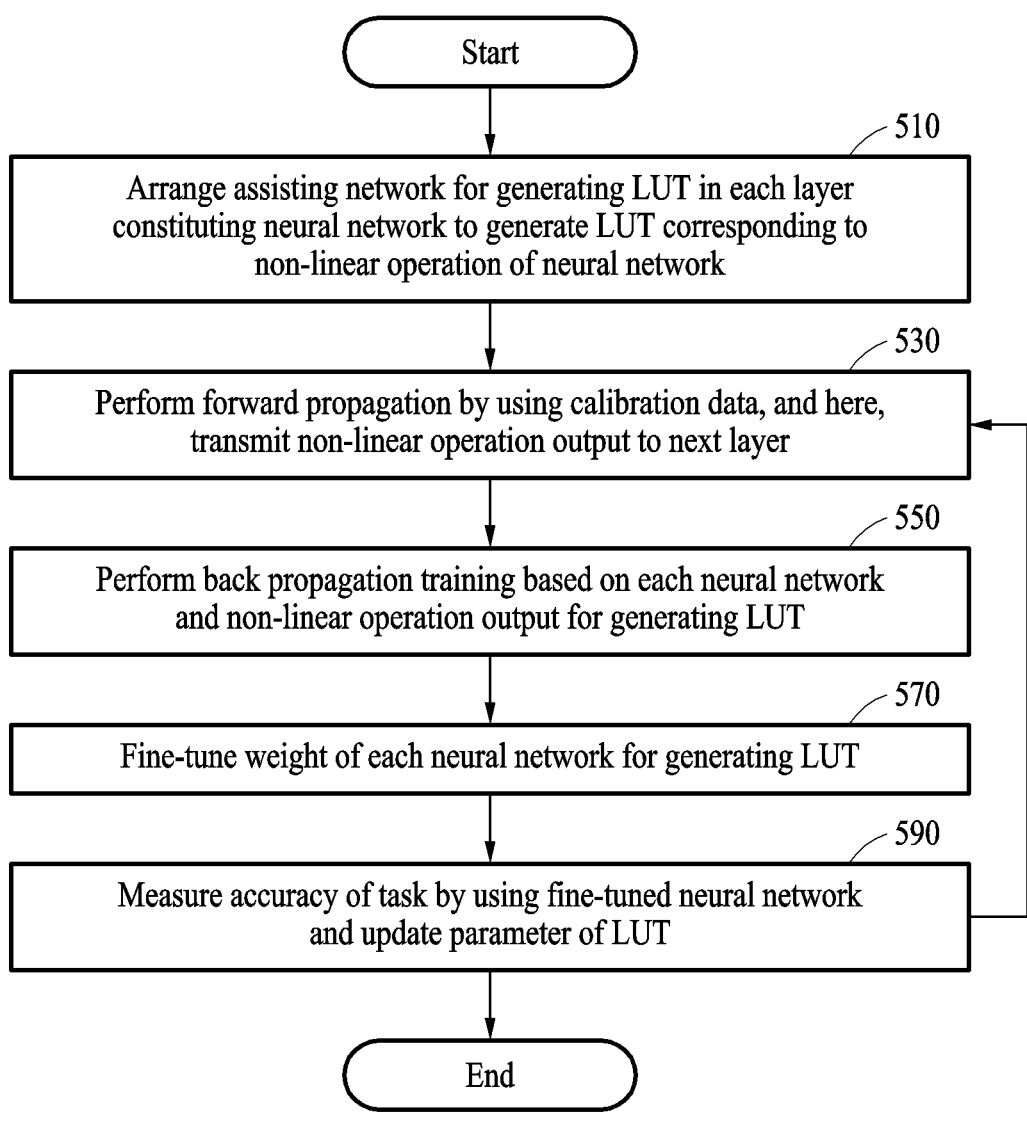
FIG. 5 illustrates an operation of measuring performance, according to one or more embodiments.

FIG. 5 illustrates a process of measuring performance, according to one or more embodiments.

Referring to FIG. 5, a processor (e.g., the processor 200 of FIG. 1) may arrange the auxiliary network for generating an LUT in each layer constituting the main neural network to generate the LUT corresponding to the non-linear function of the main neural network in operation/function 510. Here, the weight of one auxiliary network, which is trained in advance, may be used as an initial value of the weight of the auxiliary network corresponding to all layers.

The processor 200 may perform forward propagation training using the calibration data in operation 530. The processor 200 may use a part of the training data of the main neural network as the calibration data. For example, the processor 200 may use ¹⁄₁₀ of the training data of the neural network as the calibration data. The processor 200 may transmit the output of the non-linear operation/function to the next layer.

The processor 200 may perform back propagation training based on the output of the auxiliary network and the output of the non-linear operation/function to generate the LUT in operation 550. The processor 200 may generate the LUT by fine-tuning the weight (e.g., weights of respective nodes) of the auxiliary network in operation 570.

The processor 200 may measure the accuracy of the task by using the fine-tuned auxiliary network in operation 590. The processor 200 may measure the accuracy of the task through the fine-tuned auxiliary network by repeatedly performing operations 530 to 570. The processor 200 may update the neural network and/or the parameter of the auxiliary network through fine-tuning.

Through the fine-tuning method described above, the processor 200 may perform fine-tuning of the neural network and/or the auxiliary network without the need for a label using regression.

The processor 200 may prevent accumulation of error which occurs during fine-tuning by transmitting the output of the non-linear function/operation at one layer to the next layer as input thereto.

FIG. 6 illustrates an operation of the neural network operation apparatus shown in FIG. 1, according to one or more embodiments.

Referring to FIG. 6, a receiver (e.g., the receiver 100 of FIG. 1) may receive data for performing a neural network operation in operation 610.

In operation 630, a processor (e.g., the processor 200 of FIG. 1) may extract calibration data from training data for training the main neural network. The processor 200 may extract the calibration data by extracting a predetermined ratio of data among the training data. For example, the predetermined ratio may be $\frac{1}{10}$.

The processor 200 may generate an LUT for performing the non-linear operation/function included in the main neural network through the auxiliary network corresponding to the layer of the neural network, based on the calibration data, in operation 650. For example, the nonlinear operation/function may include a GELU function, a softmax function, a sigmoid function, or a layer normalization function.

The processor 200 may generate the LUT by determining the scale and the bias of the LUT for approximating the non-linear function. The processor 200 may generate a first LUT based on a first auxiliary network corresponding to a first layer of the neural network. The processor 200 may generate a second LUT based on a second auxiliary network corresponding to a second layer of the neural network.

The processor 200 may update a parameter of the LUT based on the output of the non-linear function and the output of the auxiliary network in operation 670. Specifically, the processor 200 may generate a first output of the non-linear function corresponding to the first layer of the neural network, based on the calibration data. The processor 200 may perform forward propagation by inputting the first output of the non-linear operation to the second layer of the neural network.

To further elaborate on the generating of output of the non-linear function, this may involve the processor 200 generating/updating the LUT by sampling the non-linear function (computing the non-linear function for various inputs to generate outputs of the function) based on outputs of the auxiliary network (e.g., according to scale/bias determined by the auxiliary network), and adding the samples to the LUT. In some implementations, the auxiliary network may control the scale/bias of sampling the non-linear function; the non-linear function is executed on input values determined according to the scale/bias to generate output values for respective input ranges, and the input-output pairings may be stored in the LUT. Subsequently, in use (e.g., when the main neural network is performing an inference), for a given arbitrary input value, an LUT input value in the LUT that is closest to the given input value is found, and the output value associated (in the LUT) with the target input value is selected as the output value (non-linear function value) for the given input value.

The processor 200 may fine-tune the parameter of the auxiliary network by performing back propagation based on the output of the auxiliary network and the output of the non-linear operation. The processor 200 may fine-tune the parameter of the auxiliary network based on the MAE between the output of the auxiliary network and the output of the non-linear operation.

The processor 200 may train the first layer and the second layer at the same time based on the output of the non-linear operation.

The computing apparatuses, the electronic devices, the processors, the memories, the displays, the information output system and hardware, the storage devices, and other apparatuses, devices, units, modules, and components described herein with respect to FIGS. 1-6 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A computing apparatus comprising:

one or more processors;

storage hardware storing instructions configured to, when executed by the one or more processors, cause the one or more processors to:

extract calibration data from training data that is for training a main neural network;

based on the calibration data, generate a look up table (LUT) for performing a non-linear function of the main neural network through an auxiliary network corresponding to a layer of the main neural network, wherein the LUT comprises a first LUT generated based on a first auxiliary network corresponding to a first layer of the main neural network, and wherein the LUT further comprises a second LUT generated based on a second auxillary network corresponding to a second layer of the main neural network; and update a parameter of the LUT based on an output of the non-linear function and based on an output of the auxiliary network.

2. The computing apparatus of claim 1, wherein the calibration data is extracted at a predetermined ratio from the training data.

3. The computing apparatus of claim 1, wherein:

a first output of the non-linear function corresponding to a first layer of the main neural network is generated based on the calibration data; and forward propagation is performed by inputting the first output of the non-linear function to a second layer of the main neural network.

4. The computing apparatus of claim 1, wherein the LUT is generated by determining a scale or a bias of the LUT for approximating the non-linear function.

5. The computing apparatus of claim 1, wherein a parameter of the auxiliary network is tuned by performing back propagation based on the output of the auxiliary network and the output of the non-linear function.

6. The computing apparatus of claim 5, wherein the parameter is tuned based on a mean absolute error between the output of the auxiliary network and the output of the non-linear function.

7. The computing apparatus of claim 1, wherein the first layer and the second layer are trained together based on the output of the non-linear function, wherein the non-linear function is an activation function of the first layer and the second layer.

8. The computing apparatus of claim 1, wherein the non-linear function comprises a Gaussian error linear unit (GELU) function, a softmax function, a sigmoid function, or a layer normalization function.

9. A neural network operating method performed by a computing a computing device comprising processing hardware and storage hardware, the method comprising:

extracting calibration data from training data that is for training a main neural network;

generating a look up table (LUT) for approximating a non-linear function of the main neural network, wherein the LUT is generated through an auxiliary network corresponding to a layer of the main neural network based on the calibration data, wherein the LUT comprises a first LUT generated based on a first auxiliary network corresponding to a first layer of the main neural network, and wherein the LUT further comprises a second LUT generated based on a second auxiliary network corresponding to a second layer of the main neural network; and updating a parameter of the LUT based on an output of the non-linear function and based on an output of the auxiliary network.

10. The neural network operating method of claim 9, wherein the LUT is used as an activation function of the main neural network.

11. The neural network operating method of claim 9, wherein the updating of the parameter comprises:

generating a first output of the non-linear function corresponding to a first layer of the main neural network, based on the calibration data; and performing a forward propagation by inputting the first output of the non-linear function to a second layer of the main neural network.

12. The neural network operating method of claim 9, wherein the LUT is generated by determining a scale or a bias of the LUT for approximating the non-linear function.

13. The neural network operating method of claim 9, wherein the updating of the parameter comprises tuning a parameter of the auxiliary network by performing back propagation based on the output of the auxiliary network and the output of the non-linear function.

14. The neural network operating method of claim 13, wherein the parameter is tuned based on a mean absolute error between the output of the auxiliary network and the output of the non-linear function.

15. The neural network operating method of claim 9, wherein the updating of the parameter comprises training the first layer and the second layer at the same time based on the output of the non-linear function.

16. The neural network operating method of claim 9, wherein the non-linear function comprises a Gaussian error linear unit (GELU) function, a softmax function, a sigmoid function, or a layer normalization function.

17. A non-transitory computer-readable storage medium storing instructions that, when executed by a processor, cause the processor to perform the method of claim 9.

* * * * *